US008862869B1

(12) United States Patent
Soon

(10) Patent No.: US 8,862,869 B1
(45) Date of Patent: Oct. 14, 2014

(54) METHOD AND APPARATUS FOR PROVIDING NETWORK INITIATED SESSION ENCRYPTION

(75) Inventor: Yee Ming Soon, Melbourne (AU)

(73) Assignee: Tellabs Operations, Inc., Naperville, IL (US)

( * ) Notice: Subject to any disclaimer, the term of this patent is extended or adjusted under 35 U.S.C. 154(b) by 494 days.

(21) Appl. No.: 12/957,155

(22) Filed: Nov. 30, 2010

(51) Int. Cl.
H04L 29/06 (2006.01)

(52) U.S. Cl.
USPC .......................................................... 713/153

(58) Field of Classification Search
USPC ................................... 713/153; 380/247, 270
See application file for complete search history.

(56) References Cited

U.S. PATENT DOCUMENTS

| 7,380,124 | B1 * | 5/2008 | Mizell et al. ................... 713/171 |
| 7,529,271 | B2 * | 5/2009 | Forssell ......................... 370/469 |
| 7,961,706 | B2 * | 6/2011 | Huang et al. .................. 370/349 |
| 2004/0037269 | A1 * | 2/2004 | Lundin .......................... 370/352 |
| 2010/0121960 | A1 * | 5/2010 | Baniel et al. .................. 709/228 |
| 2012/0275300 | A1 * | 11/2012 | Munoz de la Torre Alonso ......................... 370/229 |

* cited by examiner

Primary Examiner — Ali Abyaneh
(74) Attorney, Agent, or Firm — James M. Wu; JW Law Group

(57) ABSTRACT

A network system and method capable of implementing network initiated packet data protocol ("PDP") context to enhance security of network communications are disclosed. An activation and/or modification request message containing security information element is generated and forwarded from a gateway general packet radio service support node ("GGSN") to a serving general packet radio service support node ("SGSN") requesting traffic security for a particular Internet Protocol ("IP") session. After sending the activation/modification request message from SGSN to user equipment ("UE"), an IP session with PDP context encryption between the UE and a destination is initiated according to the security information element.

20 Claims, 8 Drawing Sheets

METHOD AND APPARATUS FOR PROVIDING NETWORK INITIATED SESSION ENCRYPTION

FIELD

The exemplary embodiment(s) of the present invention relates to communications network. More specifically, the exemplary embodiment(s) of the present invention relates to network security over an Internet Protocol ("IP") session between a user's terminal and a destination.

BACKGROUND

With increasing demand for more information to be transmitted between users/subscribers and various content providers, network communication providers are switching their networks to high-speed communication signaling protocol with improved network security. High-speed communication signaling protocol typically enhances bandwidth and speed for voice, video, and data transmission to/from homes and/or businesses. For the mobile communication industry, wireless providers are transitioning from 2G wireless service to more data intensive 3G or 4G services. With exploding growth of data transfer over a network, users and/or carriers continuously seek more sophisticated networking technology to meet such growth. Moving or transporting massive amount of information over a communications network, information security or traffic security has become an ever challenging technical battle field. Cloud computing and secured network access has also placed great importance and changes the way mobile devices transmit and receive traffic over the network.

To provide network security while delivering massive amount of data, a conventional approach is to activate a typical encryption method to encrypt data traffic between user mobile terminals and their destinations. A drawback associated with the conventional approach, however, is that it is rigid and inflexible. For example, a mobile user typically needs to be informed that his or her IP session(s) requires encryption. Another drawback for a conventional approach is that once encryption is initiated, all IP traffic to and from the mobile terminal is encrypted.

SUMMARY

A network system capable of providing network initiated network security using packet data protocol ("PDP") context is disclosed. An activation and/or modification request message containing security information element is generated and forwarded from a gateway general packet radio service support node ("GGSN" also PGW in the context of LTE) to a serving general packet radio service support node ("SGSN" also MME in the context of LTE) requesting traffic security for a particular Internet Protocol ("IP") session. After sending the activation request message from SGSN to user equipment ("UE"), an IP session with PDP context encryption between the UE and a destination is initiated in accordance to the information embedded inside the security information element.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
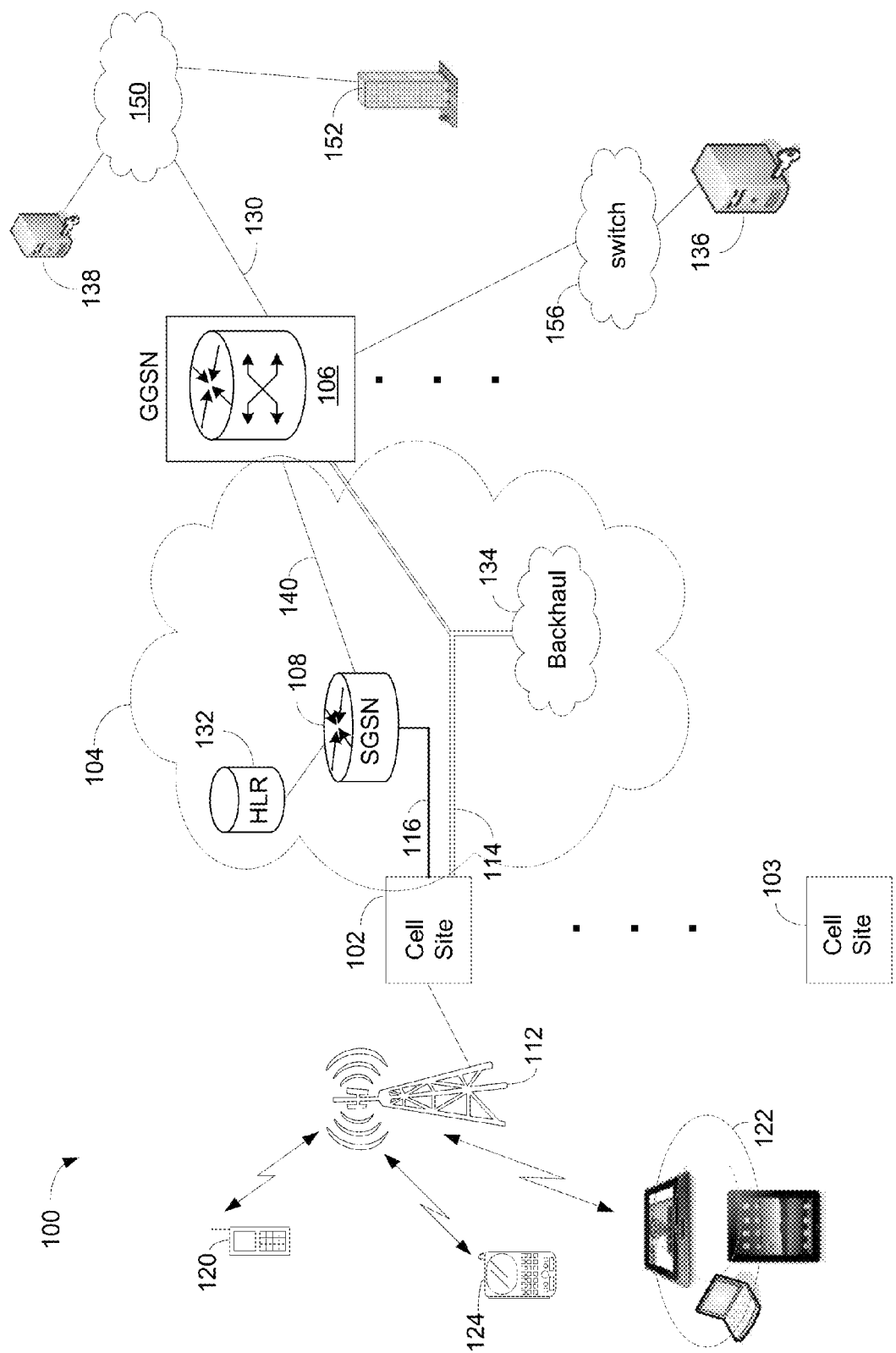
FIG. 1 is a block diagram illustrating a network configuration having one or more network nodes capable of providing network initiated packet security in accordance with one embodiment of the present invention.

Exemplary embodiment(s) of the present invention is described herein in the context of a method, device, and apparatus of providing network initiated network security utilizing packet data protocol ("PDP") context.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

It should be noted that the term "data packets" can also be referenced as "data stream," "data flow," "flow," "packet flow, " "packet stream," "data frames," "information," "frames," et cetera. Moreover, connections may also include wires, wireless connections, cables, coax lines, telephone lines, Internet backbones, Ethernet connections, and so forth.

A communications network, in one exemplary embodiment, is capable of activating a process of network initiated traffic security using packet data protocol ("PDP") context. An activation and/or modification request message containing security information element is generated and forwarded from a gateway general packet radio service support node ("GGSN") to a serving general packet radio service support node ("SGSN") requesting traffic security for a particular Internet Protocol ("IP") session. After forwarding the activation or modification request message to user equipment ("UE"), the IP session having PDP context encryption is established according to the security information element.

FIG. 1 is a block diagram 100 illustrating a network configuration having one or more network nodes capable of providing network initiated network traffic security in accordance with one embodiment of the present invention. Diagram 100 includes cell sites 102-103, a switching network 104, network nodes 106-108, and a network 150. Network 150, for example, can be a wide area network ("WAN"), virtual private network ("VPN"), and/or Internet. The terms "WAN", "VPN", and Internet are herein used interchangeably. Internet or VPN 150 may also be coupled to various network devices such as policy server or PCRF 138 and content provider 152. It should be noted that the underlying concept of the exemplary embodiment(s) of the present invention would not change if one or more blocks (or devices) were added to or removed from diagram 100.

Network node 106, in one embodiment, is a GGSN which includes one or more routers or switches capable of managing, monitoring, and routing network traffic between sources and destinations. GGSN 106, in one aspect, is further coupled to a PCRF/policy server 136 via a switch circuitry 156 and is able to receive policies and/or rule updates from policy server 136. Depending on the applications, policy server 136, for example, can be directly connected to GGSN 106. Alternatively, GGSN 106 can also be configured to accept new policies and rules from a remote policy server 138 across a network such as Internet 150. A function of GGSN 106 is to monitor and/or inspect network traffic based on policies and rules received from policy servers 136-138. GGSN 106, for example, can also be used to record network usage by users whereby users will be billed later based on the usage of the network.

The policy and rules provided by policy server 136 or 138 include, but not limited to, conditions, requirements, and services such as security services and/or QoS for different network transactions. The policy charging rule function ("PCRF"), which may reside at a node capable of supplying policy rules in real-time, controls policy decisions as to when and where to apply security encryption to a PDP context. Upon receipt of policy rules in accordance with PCRF or policy server 136 or 138, GGSN 106, for instance, establishes policy charging enforcement function ("PCEF") wherein the PCEF will be referenced and/or accessed to enforce for the PCRF. It should be noted that various triggering conditions for PCEF may vary depending on condition(s) and environments of users' PDP contexts.

To install the policy rules onto the PCEF, new diameter based attribute value pair ("AVP"), for instance, is needed via the Gx interface. Gx interface may be considered as a policy interface between GGSN 106 and the PCRF (i.e., policy server 136 or 138) during provisioning phase. AVP includes security encryption, source-destination associations, security procedure requirements and parameters. It should be noted that AVP may be applied in conjunction with other types of AVPs such as flow-information AVP and Packet-filter-Content AVP, etc.

In an alternative exemplary embodiment, the PCEF is set up at GGSN 106 in such a way that the PCEF is able to dynamically fetch policies and rules from the PCRF at policy server 136 or 138 via Gx interface as needed in accordance with the network transactions (or sessions) detected. One advantage of employing dynamic accessing polices and rules from the PCRF for enforcement is that the storage allocation for storing policies and rules at the PCEF can be reduced. Another advantage of employing dynamic fetching policies and rules from the PCRF for enforcement is that the policies and rules fetched from the PCRF are up-to-date or most current version of the policies and rules.

In one aspect, network node 106 includes a packet data network gateway ("PGW" in the context of LTE), GGSN, or a combination of GGSN and PGW. The terms "GGSN" and "PGW" will be herein used interchangeably. A function of PGW is to provide communication between a UE and a destination via IP packet data network ("PDN"). It should be noted that a UE may connect to multiple PGWs simultaneously for accessing one or more IP PDNs. Depending on the applications, PGW can selectively provide policy enforcement, user packet filtering, packet inspection, billing recordation, and so forth. It should be noted that network node, GGSN and/or PGW 106 can be part of switching network 104.

Switching network 104 is configured to transport information or network traffic between circuit-based clients and packet-switching clients. Switching network 104 can be an IP and/or Multi Protocol Label Switching ("MPLS") based switching network which may operate at a layer of Open Systems Interconnection Basic Reference Model ("OSI model"). In one aspect, network 104 includes network node 108, a home location register ("HLR" or HSS in the context of LTE) 132, a backhaul block 134, and a radio network controller ("RNC") (not shown in FIG. 1) for transferring information and/or data streams to and from network clients. Network client in one example may include one or more routers, UEs, user terminals, switches, hosts, and the like. Network 104 is capable of routing information between cell sites 102-103 and content provider 152 via nodes 106-108. While node 108 transmits signaling information between cell site 102 and HLR 132 via connections 116, backhaul block 134, for example, transmits information between cells site 102 and GGSN 106 via bus 114.

Node 108, in one embodiment, is an SGSN which is configured to authenticate portable wireless UEs, registering mobile devices, collecting some network usage information for billing, et cetera. While SGSN 108 tracks and/or controls mobile communication, GGSN 106 inspects and routes information and/or packet traffic between mobile terminal(s) and intended destination(s). Alternatively, node 108 may be a mobility management entity ("MME") which is also able to route packet streams in a long term evolution ("LTE") network. MME, for example, can track and/or page active and/or idle UEs or subscribers' mobile terminals in an LTE network. It should be noted that node 108 can be SGSN, MME, and/or a combination of SGSN and MME. The terms "SGSN" and "MME" will be used interchangeably herein.

Cell site 102, also known as base station or node B, includes a radio tower 112, wherein radio tower 112 is further coupled to various UEs, such as a cellular phone 120, a handheld device 124, iPads® 122, via wired or wireless communications. Handheld device 124 can be a smart phone, such as iPhone®, BlackBerry®, Android®, and so on. Cell site 102 is capable of communicating with mobile devices or UEs such as cellular phone 120 and handheld device 124 via radio tower 112. It should be noted that cell site 102, not shown in FIG. 1, may include additional radio towers as well as other land switching circuitry.

Referring back to FIG. 1, network configuration 100 includes GGSN 106, SGSN 108, and one or more UEs wherein UEs may be handheld device 124 and iPad$^S$® 122. To facilitate network initiated network traffic and/or PDP context encryption, GGSN 106 establishes a PCEF based upon the rules received from PCRF/policy server 136 or 138. In one embodiment, SGSN 108 is able to receive a request message containing security information element from GGSN 106 via connection 140. The request message, for instance, can be a PDP context activation message or PDP context modification message. The UE such as iPad$^S$® 122 is capable of initiating a PDP context to establish a secure IP session between the UE and a destination based on the security information element. It should be noted that by employing mobile packet core session controlling and signaling, mobile network intelligence gains and/or enhances its ability to selectively instruct end user mobile terminal to activate encryption for one or more IP sessions.

IP sessions or traffic are also known as PDP contexts in a mobile packet core network. PDP contexts generally extend from a mobile terminal (or UE) to a mobile packet core device such as UMTS GGSN or LTE PGW. Note that packets from UEs, for example, are transported over a single primary PDP context. Secondary PDP contexts or second primary PDP contexts defined in 3GPP TS can also be optionally used to transport data or instructions such as activating network initiated network security.

To activate network initiated network security, the network (or GGSN) instructs a UE to initiate a PDP context for establishing a secure IP session. Network initiated PDP context activation or modification, for example, is sent by GGSN/PGW 106 to SGSN/MME 108. The activation and/or modification message is then forwarded to a UE which could be handheld device 124. In response to the request of activation/modification message, the UE initiates a PDP context activation/modification towards the network for setting up a secure IP session. It should be noted that security elements such as encryption keys and QoS can be defined in PDP context activation and modifications.

An advantage of employing the exemplary embodiment of present invention is that it enhances network or web security for users to access VPN or enterprise cloud computing resources. Another advantage of using the exemplary embodiment of present invention is that it provides a secure environment for ecommerce mobile users to access cloud based resources for commercial transactions. Note that cloud based resources can include various types of privileged and/or sensitive information whereby only the subscribers can access such information. Embodiments of the present invention are also applicable to other mobile applications and/or cloud computing applications requiring high and/or dynamic level of security between mobile terminal and its intended destination.

Figure 2A:
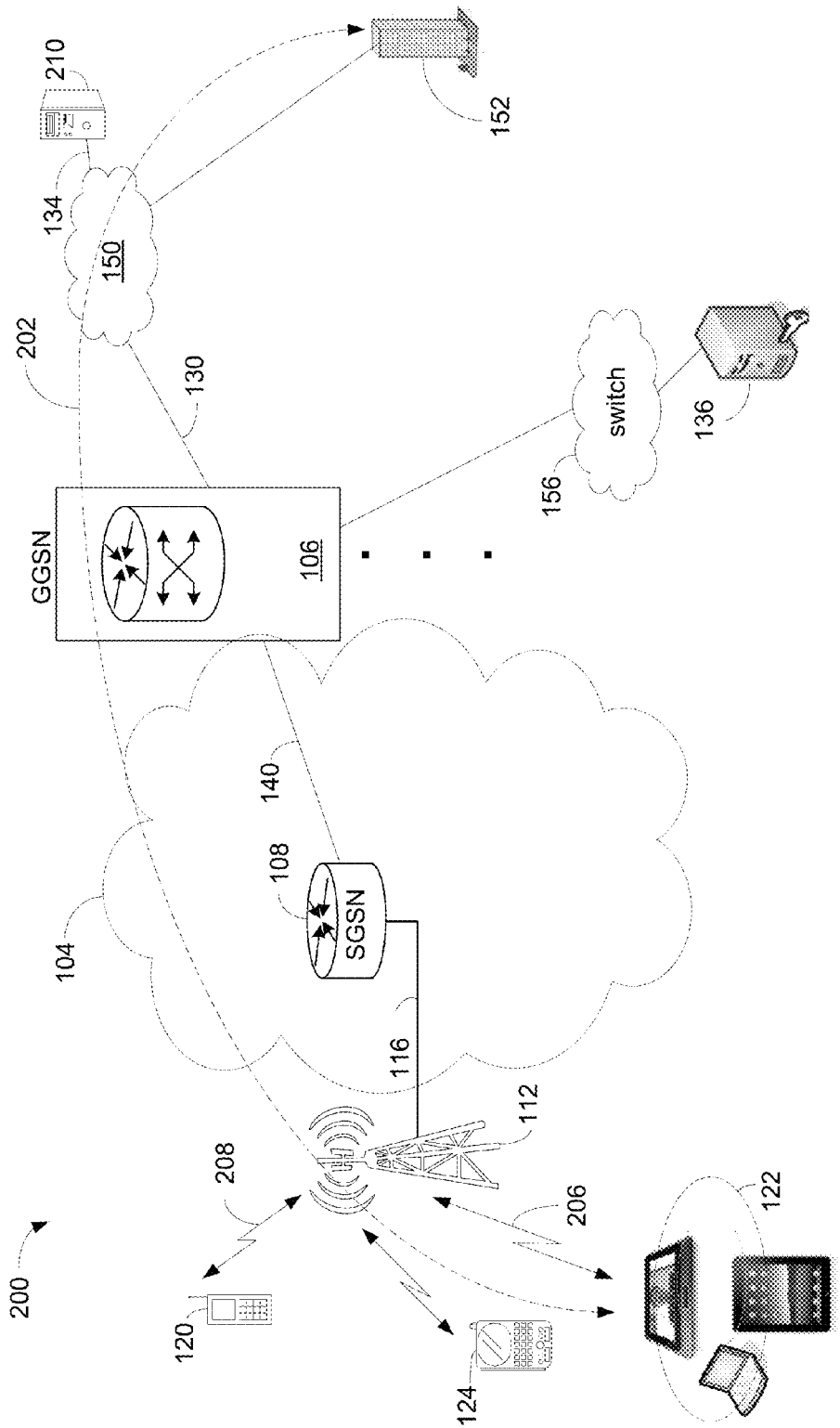
FIGS. 2A-B are block diagrams illustrating a communications network capable of initiating network security using an activation request message in accordance with one embodiment of the present invention.
Figure 2B:
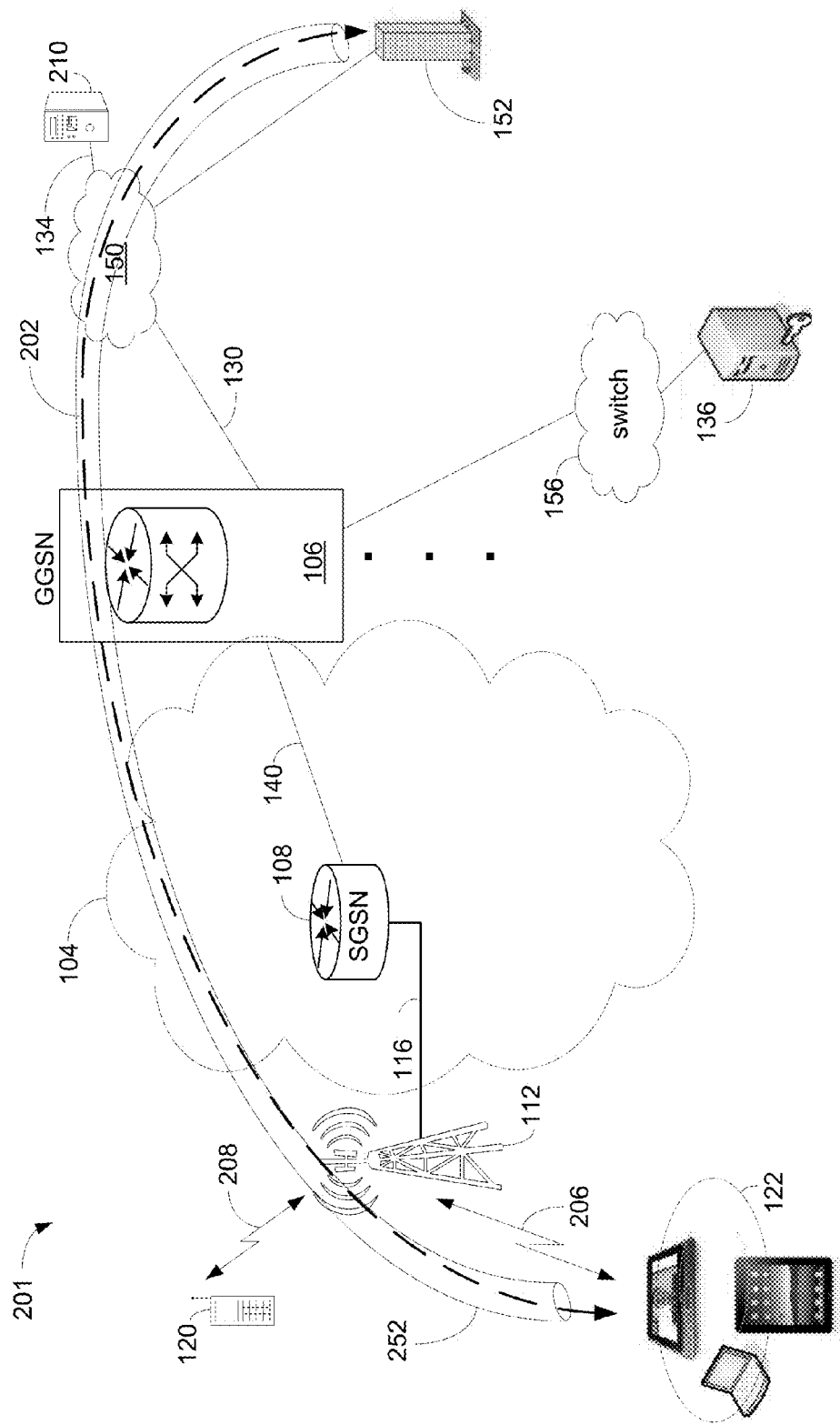

FIGS. 2A-B are block diagrams 200-201 illustrating a communications network capable of initiating network security using an activation request message in accordance with one embodiment of the present invention. Diagrams 200 and 201 are essentially simplified versions of diagram 100. Diagram 200 shown in FIG. 2A includes radio tower 112, GGSN 106, SGSN 108, and Internet 150 wherein Internet 150 further couples to various network devices such as external policy server 210 and content provider 152. Radio tower 112 is further coupled to various UEs such as cellular phone 120 and handheld device 124 via or wireless communications. While policy server 136 may be considered as internal network policy server, server 210 can be considered as an external or remote policy server. Alternatively, server 210 can also be a network server storing cloud computing resources. It should be noted that the underlying concept of the exemplary embodiment(s) of the present invention would not change if one or more blocks (or devices) were added to or removed from diagram 200.

To implement network initiated network security such as packet or traffic encryption, PDP context activation request message, in one embodiment, is used to include information element to define encrypted security association. To initiate a network requested PDP context (primary and secondary) activation, GGSN/PGW 106 sends an activation request message to SGSN/MME 108 wherein the message contains information element relating to IP security which can also be referred to as security information element. In one embodiment, the security information element includes, but not limited to, algorithm of encryption, associated key, encryption key, QoS, predefined security conditions, and so forth. In addition, the security information element may further include information relating to remote end point address for one or more UEs.

When SGSN/MME 108 detects or receives the activation request message from GGSN/PGW 106, SGSN/MME 108 subsequently forwards or routes the activation request message to the intended UE together with the security information element. Upon receipt of the activation request message, the intended UE such as handheld device 124 subsequently initiates PDP context activation procedure. Note that PDP context activation message contains security information element. A secure IP session in accordance with the PDP context activation message is established whereby the traffic is encrypted in accordance with the security information element before it is being sent across the secure IP session. The secure IP session, in one embodiment, is maintained for a predefined period of time. Alternatively, the secure IP session is maintained until a session termination instruction is received.

Upon detecting a network access or transaction, GGSN 106 inspects and/or identifies information in packet header such as hypertext transfer protocol (HTTP) address (URL) or other meta data to determine whether the session requires security according to the PCEF rules. Once a match is found, the session identifier is extracted. The session identifier includes, but not limited to, source IP address, destination IP address, source port, and destination port and IP protocol type. The session identifier is subsequently used to generate a traffic flow template ("TFT") which will then be forwarded to SGSN 108 for network encryption. TFT and other information elements such as QoS are used to generate an activation request message at the UE. Depending on the applications, the information in TFT may be included in the activation request message. An advantage of employing the embodiment of the present invention is that it can selectively secure one or more IP sessions out of multiple active sessions of an the UE.

During an operation, iPads® 122 tries to establish an IP session 202 to access information at content provider 152. Upon detecting the establishment of IP session 202, GGSN 106 checks PCEF in view of IP session 202, and sends an activation request message to SGSN/MME 108 containing security information element in accordance with the PCEF. When SGSN/MME 108 receives the activation request message from GGSN 106, SGSN/MME 108 forwards the activation request message to iPads® 122 instructing iPads® 122 to initiate a PDP context activation procedure according to the security information element. iPads® 122 subsequently initiates PDP context activation procedure upon receipt of the activation request message. A secure IP session 252 as shown in FIG. 2B is established with the packet encryption in accordance with the security information element.

Once the IP security is established, secure IP session 252, in one embodiment, may be torn down after completion of obtaining the privileged data from content provider 152. For example, secured IP session 252 is removed after detecting a timeout signal. Alternatively, secure IP session 252 is permanent until a tear-down or removal instruction is received. Also, secure IP session 252 is removed upon detecting a session termination. For example, when UE 122 ends network session 202, secure IP session 252 is subsequently terminated as well. It should be noted that iPads® 122 may have another active unsecure IP session in place between iPads® 122 and data server 210.

To remove secure IP session 252, UE 122 (iPads®), in one aspect, initiates a PDP context or message to tear down secure IP session 252 when the privileged data or requested data is obtained. To tear down a permanent secure IP session, GGSN/PGW 106, for example, sends an deactivation request message to SGSN/MME 108 for removal of secure IP session based on removal information embedded in the security information element. Exemplary removal information includes, but not limited to, algorithm of decryption, associated key, decryption key, process of tearing down, and so forth. When SGSN/MME 108 receives the request message of secure session removal, it forwards the request message to an intended UE. Upon receipt of the deactivation request message, the intended UE such as iPads® 122 subsequently initiates PDP context deactivation procedure to remove secure IP session 252. It should be noted that activation and/or modification procedures are generally originated and/or terminated at the same location(s) or node(s) in a network.

An advantage of employing the exemplary embodiment(s) of the present invention is that it provides flexibility of security association and/or destination by network clients such as wireless portable devices. For example, the process of network initiated network security allows a UE to setup its security association with any server or gateway in the network in accordance with information such as encryption embedded inside the security information element.

Figure 3A:
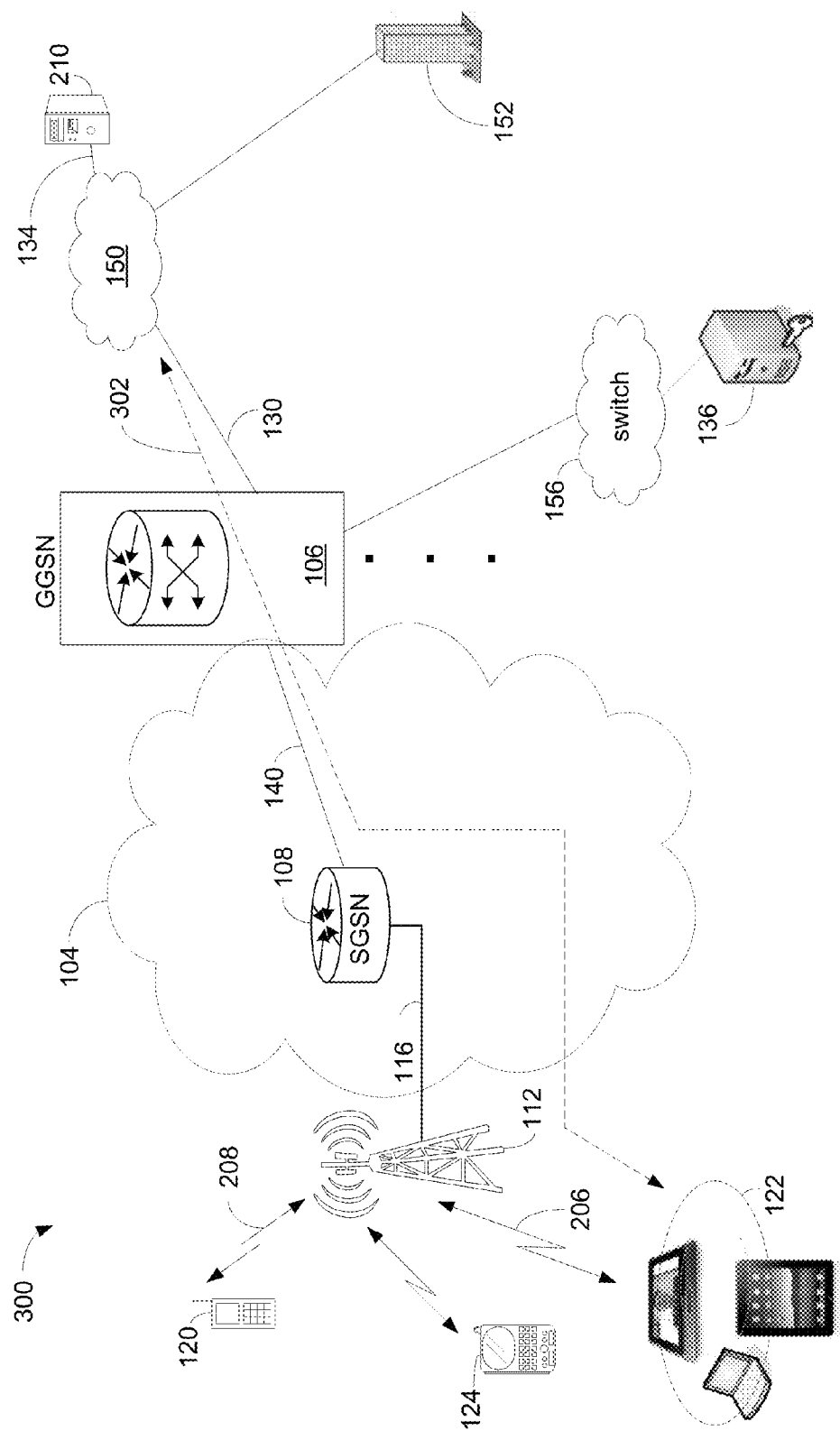
FIGS. 3A-B are block diagrams illustrating a communications network capable of initiating network security using a modification request message in accordance with one embodiment of the present invention.
Figure 3B:
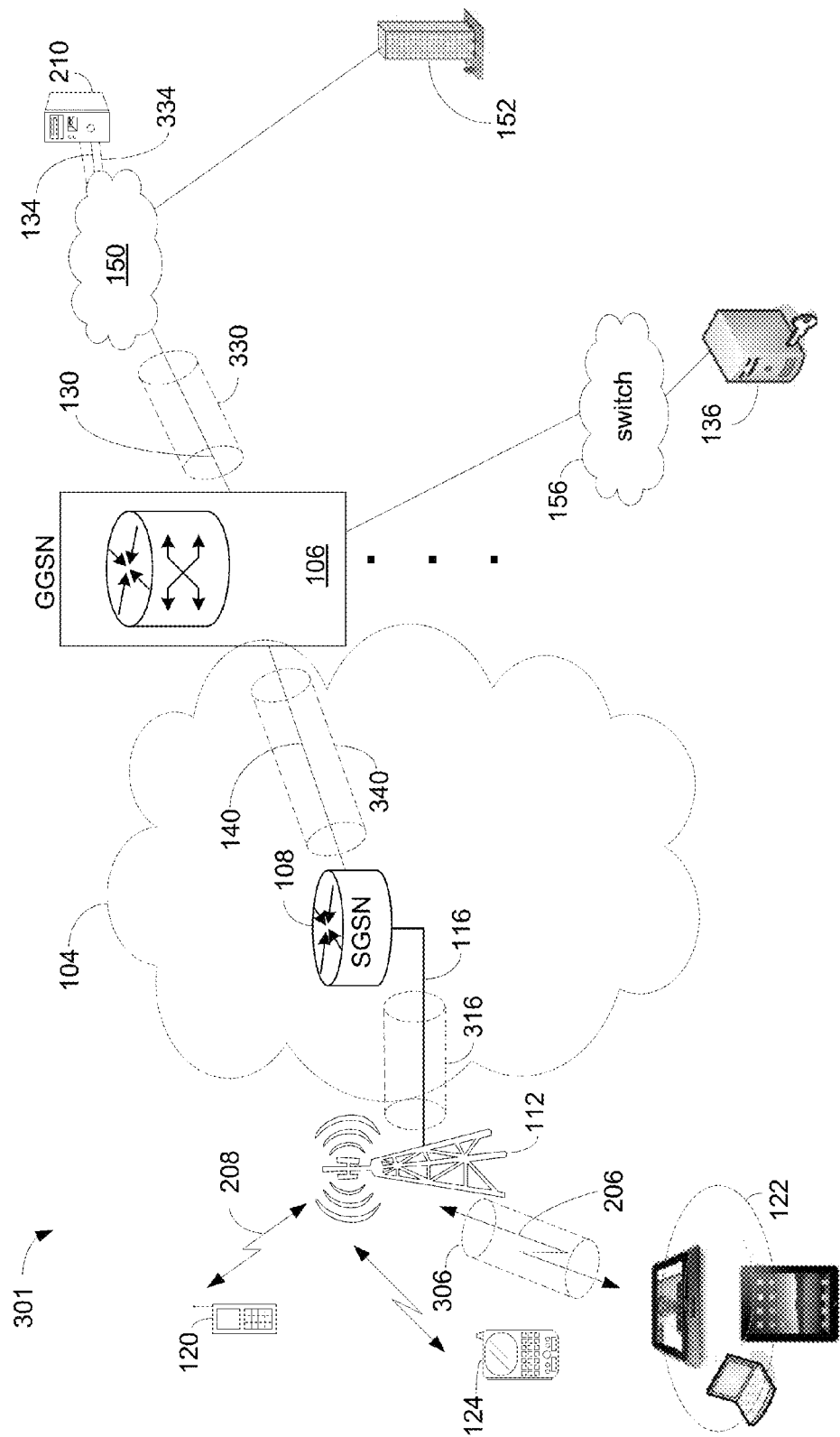

FIGS. 3A-B are block diagrams 300-301 illustrating a communications network capable of initiating network security using a modification request message in accordance with one embodiment of the present invention. Diagrams 300 and 301 are essentially simplified versions of diagram 100. Diagram 300 shown in FIG. 3A, similar to diagram 200, includes a radio tower 112, GGSN 106, SGSN 108, and Internet 150 which can also be configured to couple to a data server 210 and a content provider 152. It should be noted that the underlying concept of the exemplary embodiment(s) of the present invention would not change if one or more blocks (or devices) were added to or removed from diagram 300.

To implement network initiated network security such as packet encryption, PDP context modification request message, in one embodiment, is used to include information element to define encrypted security association. To initiate a network requested PDP context (primary and secondary) activation, GGSN/PGW 106 sends a modification request message to SGSN/MME 108 containing security information element which, as discussed above, is also known as information element relating to IP security.

When SGSN/MME 108 detects or receives the modification request message from GGSN/PGW 106, it forwards the modification request message to the intended UE together with the security information element. The intended UE such as handheld device 124 subsequently initiates PDP context modification procedure after receiving the modification request message from SGSN/MME 108. Note that PDP context modification message can optionally carry security information element. A secure IP session in accordance with the PDP context modification message is subsequently established whereby packets traveling through the secure IP session are encrypted and/or protected in accordance with the security information element. The secure IP session, in one embodiment, is maintained for a predefined period of time. Alternatively, the secure IP session is maintained until a tear-down (or removal) instruction is received.

During an exemplary operation, iPads® 122 begins to access subscribed or privileged information from data server 210 via an existing IP session 302 as shown in FIG. 3A. IP session 302 passes through radio tower 112, SGSN 108, GGSN 106, Internet 150 using connections 206, 116, 140, 130, and 134. Upon detecting the access of the privileged information via IP session 302, GGSN 106 checks security options in accordance with the PCEF and subsequently sends a modification request message to SGSN/MME 108 instructing iPads® 122 to initiate a PDP context modification procedure according to the security information element. During the detection phase, GGSN, for example, is able to perform a real-time deep packet inspection ("DPI") in accordance with the policies and rules from the PCRF. When SGSN/MME 108 receives the modification request message from GGSN 106, it forwards the modification request message to iPads® 122 together with the security information element. After iPads® 122 receives instruction to initiate a PDP context action from SGSN 108, iPads® 122 initiates a PDP context modification procedure to modify IP session 302 according to the security information element. A secure IP session 306-334 as shown in FIG. 3B is established with packet encryption in accordance with the security information element. Secure IP session 306-334 may be torn down as soon as the intended privileged content is obtained from data server 210. Alternatively, secure IP session 306-334 is permanently set until a tear-down or removal instruction is received. It should be noted that iPads® 122 may have other active unsecure IP sessions in place between iPads® 122 and content provider 210.

If an unsecure IP session is exist, PDP context modification procedure may be used to change from an unsecure IP session to a secure IP session. If, however, an IP session needs to be established, PDP context activation procedure may be used to establish a secure IP session. After execution of PDP context activation and/or modification procedure, a secure IP association is in place between the UE and GGSN/PGW 106 wherein IP packets travel through the secure IP session are encrypted at the IP layer within the PDP context. If other PDP contexts are present on the same UE, the other PDP contexts may or may not be encrypted. It should be noted that each IP session can be independently analyzed and encrypted regardless of the status of the other related IP sessions.

For example, GGSN 106 receives a policy rule from the PCRF which informs GGSN 106 that all Salesforce.com CRM (customer relation management) application on APN x.y.z must receive certain QoS and must be IP security encrypted. GGSN 106 performs real-time DPI on user traffic to identify Salesforce.com CRM session. Upon discovery of Salesforce.com CRM session, necessary ID and attributes (parameters) defined in the TFT are extracted. GGSN 106 subsequently performs the PDP context activation/modification procedure with TFT to identify, segregate, and encrypt data stream for Salesforce.com CRM application.

An advantage of using the embodiment(s) of present invention is that it optionally selects IP session(s) based encryption from Mobile terminal. Multiple IP sessions can be present between one mobile terminal and multiple different destinations. Encryption may be selectively applied on one or more IP sessions based on per-request basis. Another advantage of employing the exemplary embodiment(s) is to provide an In-band signaling mechanism which is able to instruct mobile terminal to initiate encryption of a selected IP session.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 4:
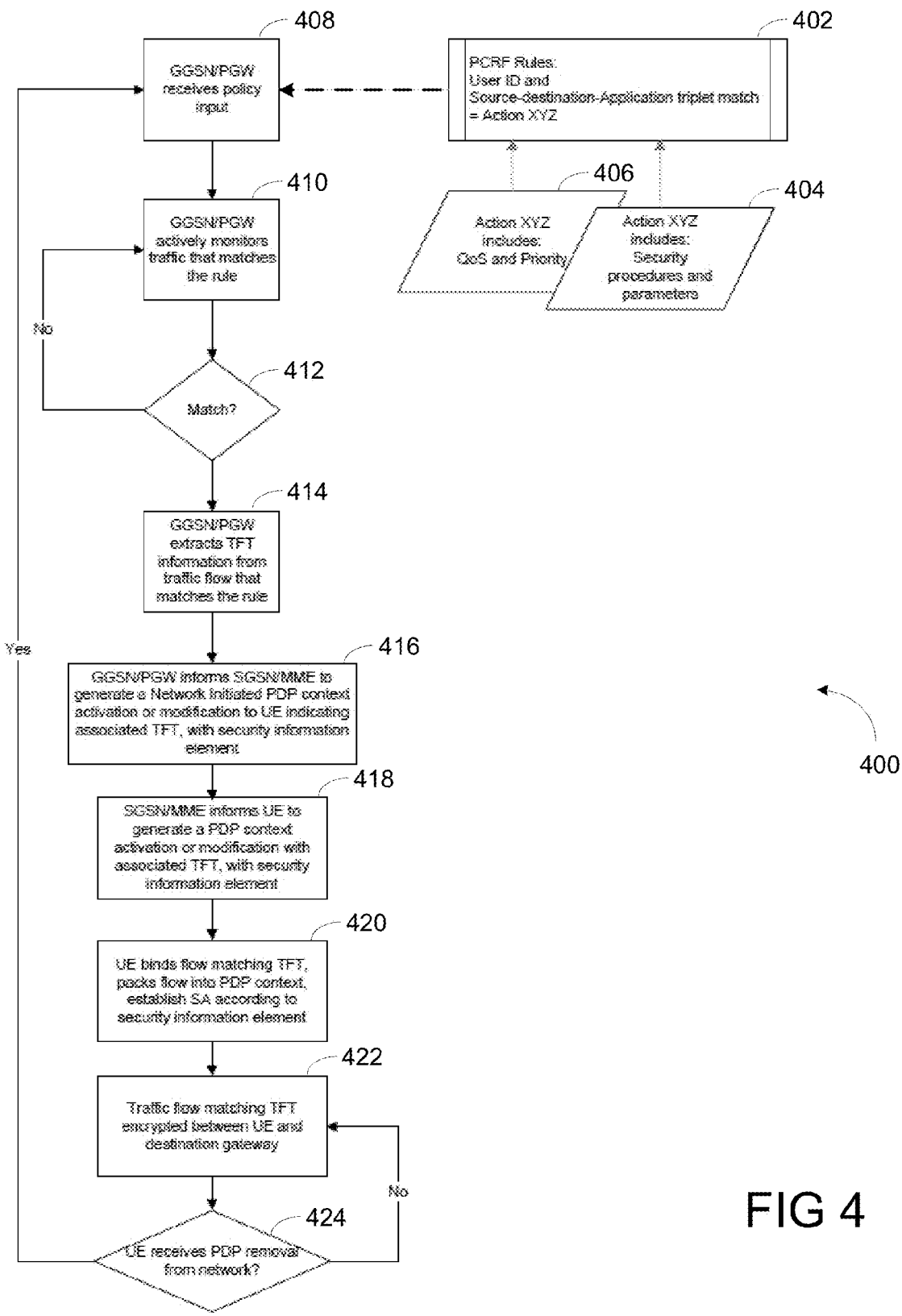
FIG. 4 is a flowchart illustrating a communications network capable of providing network initiated network security in accordance with one embodiment of the present invention.

FIG. 4 is a flowchart 400 illustrating a communications network capable of providing network initiated IP security in accordance with one embodiment of the present invention. Upon obtaining rules, actions, attributes, and/or parameters from blocks 404-406, PCRF rules at block 402 are established or loaded. In one aspect, PCRF contains various rules and policies that include, but not limited to, user identification ("ID"), source-destination-application triplet match, QoS, priorities, security procedures and parameters. Upon receipt of policy and rules at block 408, GGSN/PGW, at block 410, monitors and/or inspects packet traffic in accordance with the rules. If an IP session fails to match with the rule(s) in the PCRF, the process proceeds to block 410 to continue monitoring. Otherwise proceeds to block 414.

At block 414, GGSN/PGW extracts TFT information from matched traffic and, at block 416, informs SGSN/MME to generate a network initiated PDP context activation or modification to UE with security information element. At block 418, SGSN/MME informs or instructs UE to generate a PDP context activation or modification with associated TFT containing security information element. The UE, at block 420, binds flow matching TFT and packs traffic flow into PDP context. Security association according to security information element is subsequently established between the UE and an intended destination. At block 422, the process matches TFT encryption between the UE and the destination gateway. At block 424, if the UE receives PDP removal from the network, the process proceeds to block 408. Otherwise, the process moves to block 422 maintaining the secure IP session.

Figure 5:
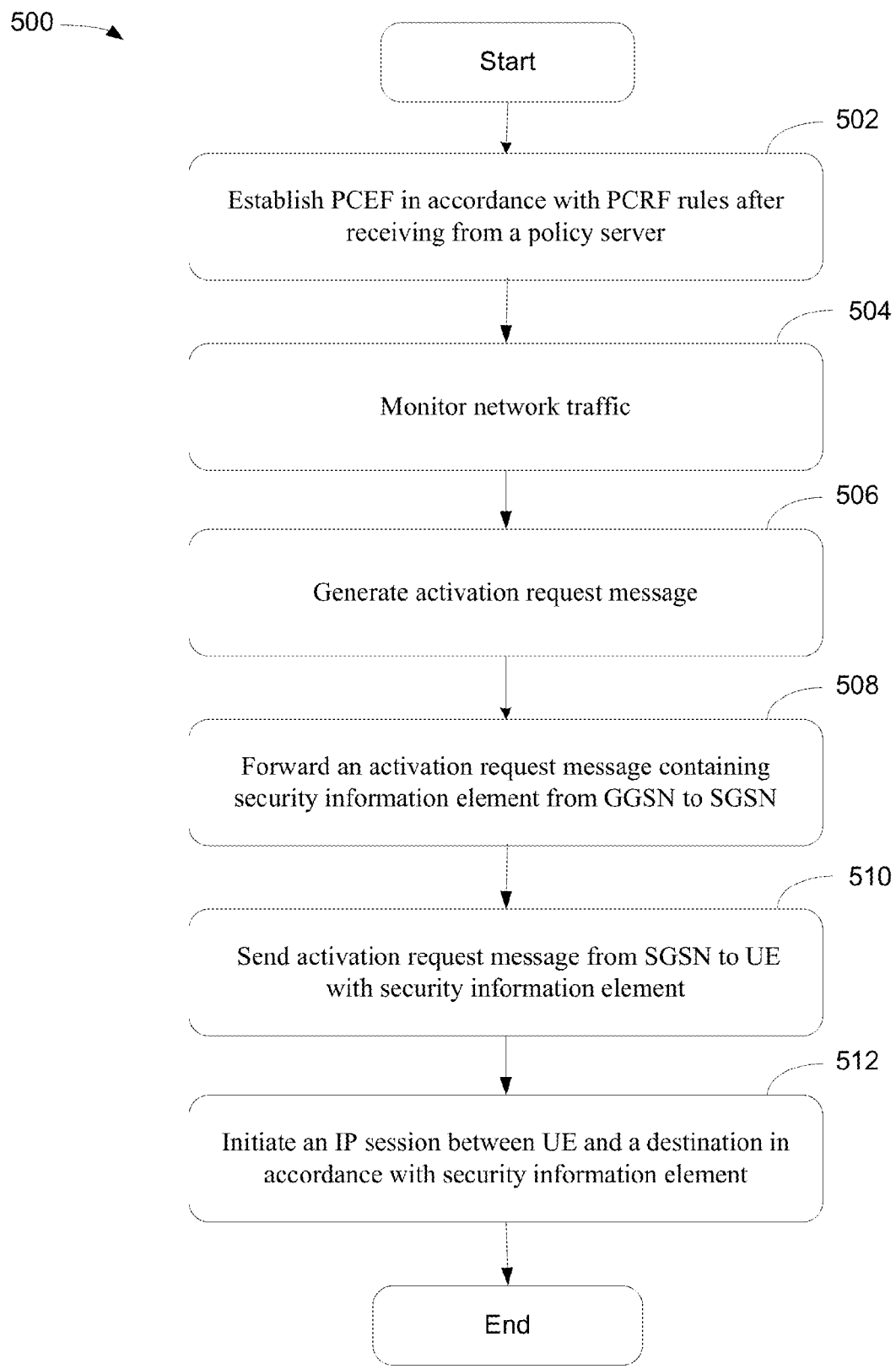
FIG. 5 is a flowchart illustrating a process of network initiated network security using an activation request message in accordance with one embodiment of the present invention.

FIG. 5 is a flowchart 500 illustrating a process of network initiated network security using an activation request message in accordance with one embodiment of the present invention. At block 502, the process establishes a PCEF at a GGSN after receipt of rules from a PCRF/policy server. Note that the PCRF associated with predefined IP sessions is loaded or generated at a policy server.

At block 504, the process begins to monitor network traffic passing through the GGSN in response to the PCEF. In one embodiment, the process inspects packet streams in the network traffic utilizing DPI in light of the PCEF.

At block 506, an activation request message in accordance with a set of predefined session identifying information is generated in accordance with a match. A match, for example, is identified when an IP session of network traffic matches with a predefined IP session contained in the PCEF. Session identifying information, which includes user ID, source-destination-application triplet match, QoS, priorities, et cetera, is obtained upon detecting a match. To retrieve session identifying information, the process, for example, is able to extract identity information such as session ID from TFT of the IP session.

At block 508, the activation request message containing security information element is forwarded from a GGSN to a SGSN. The security information element includes encryption algorithm, security procedures associated with an identified IP session in accordance with the PCEF.

At block 510, a UE receives the activation request message with the security information element from SGSN. In one aspect, the process is capable of informing a portable wireless communications device to generate a PDP context activation to incorporate one or more security features.

At block 512, a secure IP session between the UE and a destination is initiated in accordance with the security information element. For example, a PDP context is initiated to establish a secure communication between the UE and a web portal. In one embodiment, the secure IP session is dynamically launched depending on the access of destination. For example, the destination can be a cloud computing resource containing privileged information. Alternatively, the secure IP session is kept alive until a torn-down instruction is received.

Figure 6:
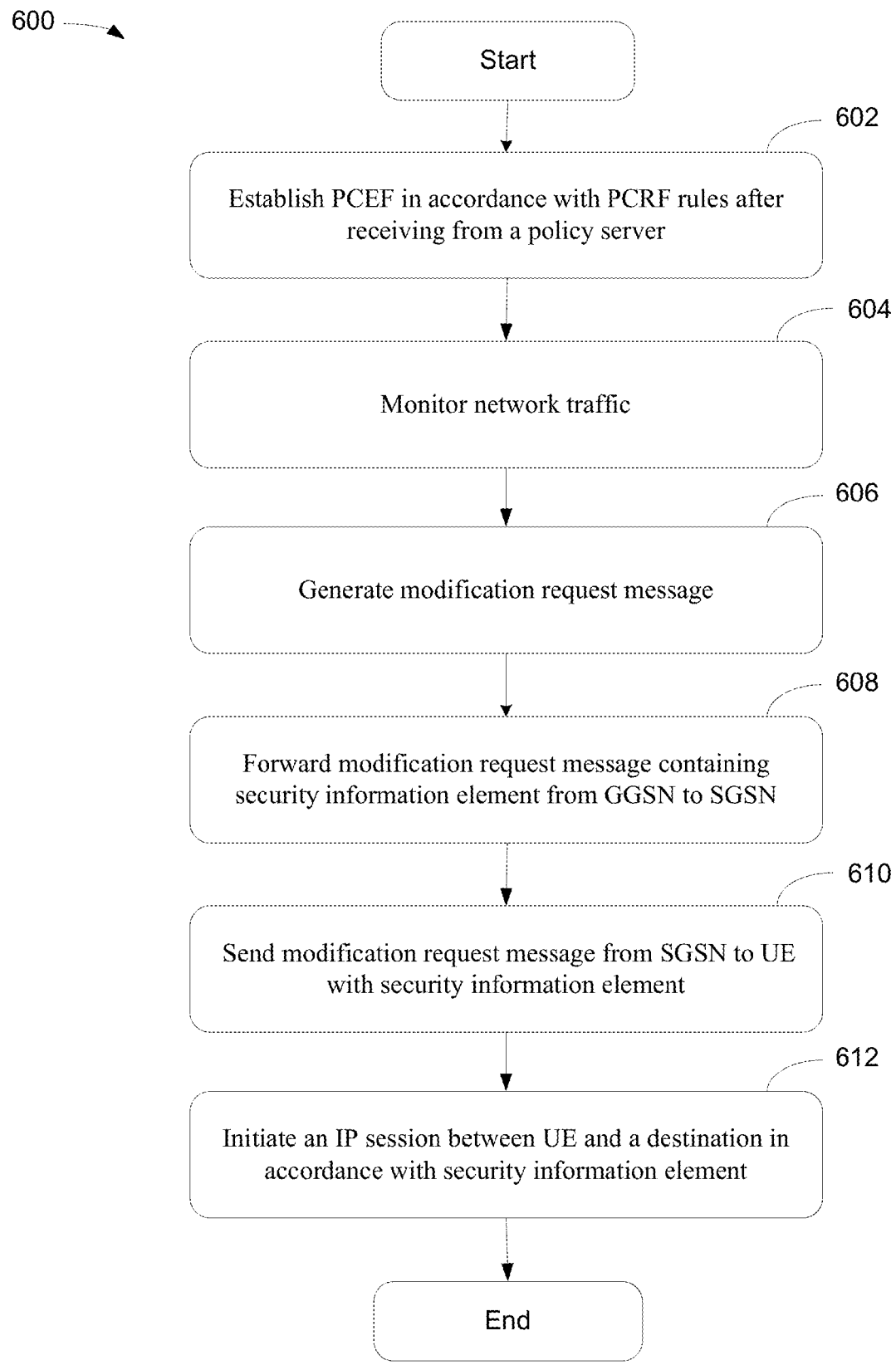
FIG. 6 is a flowchart illustrating a process of network initiated network security using a modification request message in accordance with one embodiment of the present invention.

FIG. 6 is a flowchart 600 illustrating a process of network initiated network security using a modification request message in accordance with one embodiment of the present invention. At block 602, the process establishes a PCEF at a GGSN after receipt of policy rules from a PCRF/policy server. Note that the PCRF associated with predefined IP sessions is loaded or generated at a policy server.

At block 604, the process begins to monitor network traffic passing through the GGSN in response to the PCEF. In one embodiment, the process inspects packet streams in the network traffic via DPI in light of the PCEF.

At block 606, an activation request message in accordance with a set of predefined session identifying information is generated in accordance with a match. A match, for example, is identified when an IP session of network traffic matches with a predefined IP session contained in the PCEF. Session identifying information, which includes user ID, source-destination-application triplet match, QoS, priorities, et cetera, is obtained upon detecting a match. To retrieve session identifying information, the process, for example, is able to extract identity information such as session ID from TFT of the IP session.

At block 608, the modification request message containing security information element is forwarded from a GGSN to a SGSN. The security information element includes encryption algorithm associated with an identified IP session in accordance with the PCEF.

At block 610, the modification request message with the security information element is sent from SGSN to a UE. In one aspect, the process is capable of informing a portable wireless communications device to generate a PDP context modification to modify one or more security features for an existing IP session.

At block 612, a secure IP session between the UE and a destination is initiated in accordance with the security information element. For example, a PDP context is initiated to modify an existing IP session to a secure communication between the UE and a web portal. In one embodiment, the secure IP session is dynamically modified depending on the nature of access to a destination. For example, the nature of access is a payment transaction. The destination, for instance, can be a cloud computing resource containing privileged information. Alternatively, the secure IP session is kept alive until a torn-down modification is received.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for network communication, comprising:
    forwarding an activation request message containing a security information element associated with an identified session security from a gateway general packet radio service support node ("GGSN") to a serving general packet radio service support node ("SGSN");
    sending the activation request message with the identified session security from SGSN to a user equipment ("UE") operable by an end user;
    initiating, by the UE, an Internet Protocol ("IP") session between the UE and a destination in accordance with the identified session security of the security information element; and
    establishing policy charging rule function ("PCRF") associated with a plurality of predefined IP sessions, wherein forwarding the activation request message further includes sending encryption algorithm and security procedures associated with an identified IP session in accordance with the PCRF.

2. The method of claim 1, further comprising:
    transferring PCRF rules to the GGSN over a communications network from a policy server; and
    establishing policy charging enforcement function ("PCEF") in accordance with the PCRF rules.

3. The method of claim 2, further comprising monitoring network traffic passing through the GGSN in accordance with the PCEF.

4. The method of claim 3, further comprising obtaining a set of predefined session identifying information upon identifying a match between an IP session in network traffic and one of the plurality of predefined IP session.

5. The method of claim 3, wherein monitoring network traffic passing through the GGSN includes inspecting packet streams in the network traffic utilizing deep packet inspection ("DPI") within function of the PCEF.

6. The method of claim 4, further comprising generating the activation request message in accordance with the set of predefined session identifying information and the PCEF.

7. The method of claim 4, wherein obtaining a set of predefined session identifying information upon identifying a match between an IP session within the network traffic and one of the plurality of predefined IP session includes extracting session identification ("ID") information from traffic flow template ("TFT") of the IP session.

8. The method of claim 1, wherein sending the activation request message from SGSN to a user equipment ("UE") with the security information element further includes informing a portable wireless communications device to generate a packet data protocol ("PDP") context activation to incorporate at least a portion of security information element.

9. The method of claim 1, wherein initiating an IP session between the UE and a destination includes initiating a packet data protocol ("PDP") context that establishes a secure communication between the UE and a web portal.

10. A method for network communication, comprising:
    forwarding a modification request message containing a security information element associated with an identified session security from a gateway general packet radio service support node ("GGSN") to a serving general packet radio service support node ("SGSN");
    sending at least a portion of the modification request message with the identified session security from SGSN to a user equipment ("UE");
    initiating a packet data protocol ("PDP") context by the UE in response to the identified session security to establish a secure Internet Protocol ("IP") session between the UE and a destination; and
    establishing policy charging rule function ("PCRF") associated with a plurality of predefined IP sessions wherein forwarding the modification request message further includes sending encryption algorithm and security procedures associated with an identified IP session in accordance with the PCRF.

11. The method of claim 10, further comprising:
    transferring PCRF rules to the GGSN over a communications network from the PCRF or policy server; and
    establishing policy charging enforcement function ("PCEF") in accordance with the PCRF.

12. The method of claim 11, further comprising monitoring network traffic passing through the GGSN in accordance with the PCEF.

13. The method of claim 10, further comprising obtaining a set of predefined session identifying information upon identifying a match between an IP session in network traffic and one of the plurality of predefined IP session.

14. The method of claim 13, further comprising generating the modification request message in accordance with the set of predefined session identifying information and the PCEF.

15. The method of claim 10, wherein initiating a PDP context containing the security information element includes establishing a secure communication between a portable wireless communication device and a web portal.

16. A communications network, comprising:
- a gateway general packet radio service support node ("GGSN") configured to establish policy charging enforcement function ("PCEF") based upon policy charging rules received from a policy charging rule function ("PCRF") or policy server;
- a serving general packet radio service support node ("SGSN") coupled to GGSN, wherein GGSN forwards a request message containing security information element to SGSN, wherein the request message further includes an encryption algorithm and security procedures associated with an identified IP session in accordance with the PCEF, and;
- a user equipment ("UE") operable by an end user coupled with SGSN and configured to initiate a secure Internet Protocol ("IP") session via a packet data protocol ("PDP") context between the UE and a destination in accordance with an identified session security information received from earlier transmission generated by the GGSN via SGSN.

17. The network of claim 16, wherein the request message is one of PDP context activation message and PDP context modification message.

18. A method for network communication, comprising:
- generating attribute value pair ("AVP") packed with at least a portion of security information and transferring the at least a portion of security information from a policy charging rule function ("PCRF") to a policy charging enforcement function at a gateway general packet radio service node ("GGSN");
- forwarding an activation request message containing a security information element having a first session encryption algorithm from the GGSN to a serving general packet radio service support node ("SGSN"), wherein forwarding the activation request message further includes sending encryption algorithm and security procedures associated with an identified IP session in accordance with the PCRF;
- sending the activation request message from SGSN to a user equipment ("UE") with the security information element; and
- initiating, by the UE, an Internet Protocol ("IP") session between the UE and a destination in accordance with the first session encryption algorithm of the security information element.

19. The method of claim 18, further comprising selecting one of a plurality of IP sessions between a mobile terminal and multiple destinations to be encrypted in accordance with the PCRF.

20. The method of claim 18, further comprising initiating an encrypted session from a user terminal ("UE") towards one of the multiple destinations in a network in response to information embedded in the security information element.

* * * * *